United States Patent
Roloff et al.

(10) Patent No.: US 6,439,353 B2
(45) Date of Patent: Aug. 27, 2002

(54) AIRCRAFT WHEEL BRAKE WITH EXCHANGEABLE BRAKE SEGMENTS

(75) Inventors: Gerd Roloff, Buxtehude; Tilman Haug, Weissenhorn, both of (DE)

(73) Assignee: Airbus Deutschland GmbH, Hamburg (DE)

(*) Notice: Subject to any disclaimer, the term of this patent is extended or adjusted under 35 U.S.C. 154(b) by 0 days.

(21) Appl. No.: 09/760,158

(22) Filed: Jan. 11, 2001

(30) Foreign Application Priority Data

Jan. 12, 2000 (DE) .......................... 100 00 915

(51) Int. Cl.⁷ ........................... F16D 65/12; F16D 55/36
(52) U.S. Cl. .................. 188/73.32; 188/18 A; 188/73.2; 188/71.5; 188/218 XL; 188/251 A
(58) Field of Search .................. 188/71.1, 218 XL, 188/73.2, 250 B, 250 G, 251 A, 251 R, 251 M, 71.5, 18 A, 73.39, 73.32, 244, 245, 206 R, 206 A, 205 R, 205 A, 73.1, 366, 367; 192/107 M, 107 R, 70.13, 70.14, 70.2; 301/6, 8

(56) References Cited

U.S. PATENT DOCUMENTS

| | | | |
|---|---|---|---|
| 2,893,519 A | | 7/1959 | Martin |
| 3,194,347 A | * | 7/1965 | Hall ...................... 188/218 XL |
| 3,403,759 A | * | 10/1968 | Holcomb, Jr. ........ 188/218 XL |
| 3,807,534 A | | 4/1974 | Eldred |
| 4,119,179 A | * | 10/1978 | Masclet ................... 188/73.2 |
| 4,763,762 A | * | 8/1988 | Schneider et al. ...... 188/25 LA |
| 5,293,966 A | * | 3/1994 | Chareire .................... 188/71.5 |
| 5,503,254 A | | 4/1996 | Fisher et al. |
| 5,782,320 A | | 7/1998 | Fisher et al. |

FOREIGN PATENT DOCUMENTS

| | | | |
|---|---|---|---|
| DE | 1450141 | | 7/1970 |
| DE | 4333202 | | 4/1994 |
| DE | 19711829 | | 9/1998 |
| DE | 19752777 | | 7/1999 |
| DE | 10000915 | * | 7/2001 |
| WO | WO89/02547 | | 3/1989 |

* cited by examiner

Primary Examiner—Douglas C. Butler
(74) Attorney, Agent, or Firm—W. F. Fasse; W. G. Fasse

(57) ABSTRACT

A vehicle brake arrangement includes a packet of alternating stator brake disks and rotor brake disks that are parallel and rotatable relative to each other. Each stator brake disk includes a support ring, support arms that are circumferentially distributed about, connected to, and protruding radially from an outer circumference of the support ring, and plate-shaped brake segments respectively removably secured in segment-shaped spaces between neighboring ones of the support arms by pivotable latch bars and spring-biased catches engaging recesses of the brake segments. Each brake segment includes a plate-shaped carrier, and a brake pad adhered onto at least one major surface of the carrier. The pads are made of sintered metal and the rotor brake disks are made of a ceramic or ceramic composite. Selective frictional contact between the sintered metal brake pads and the ceramic rotor brake disks provides effective braking friction, and the brake segments are easily exchangeable.

24 Claims, 2 Drawing Sheets

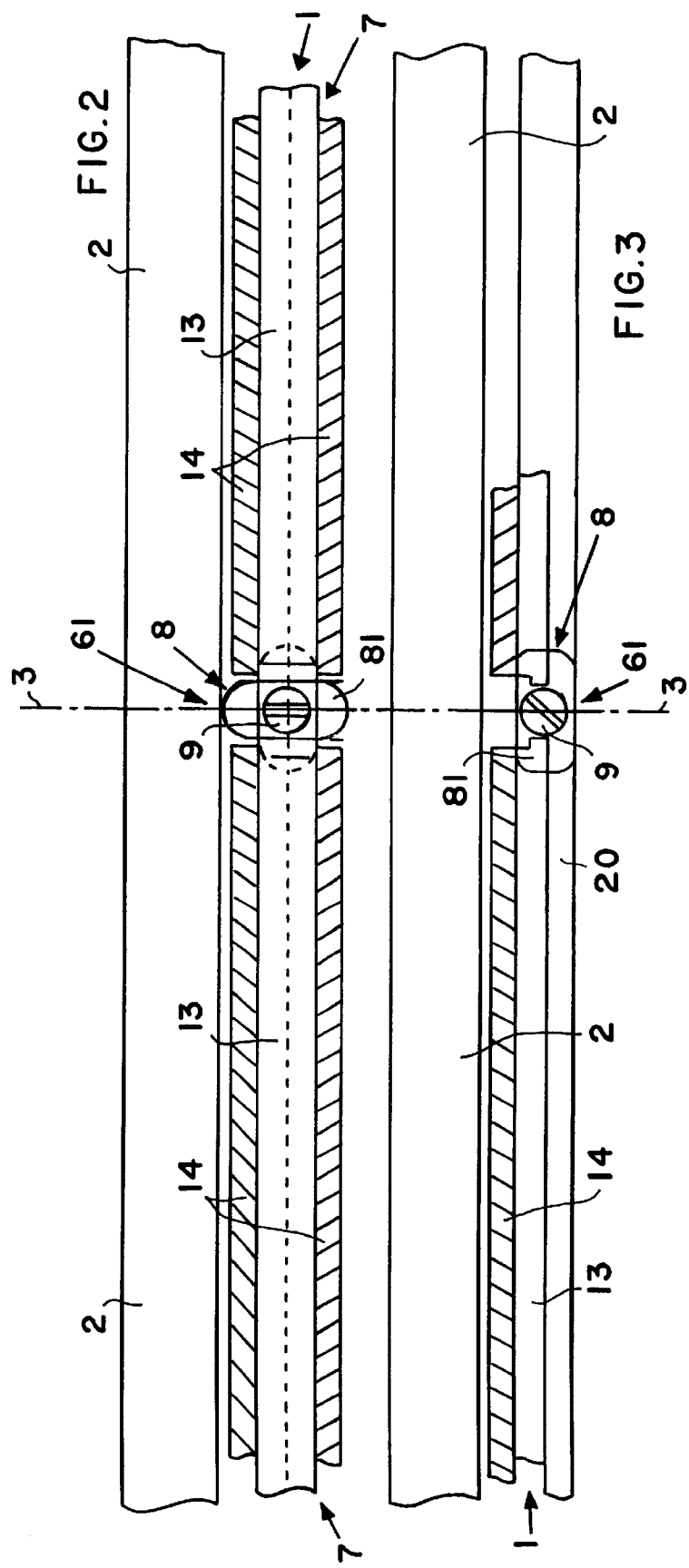

AIRCRAFT WHEEL BRAKE WITH EXCHANGEABLE BRAKE SEGMENTS

PRIORITY CLAIM

This application is based on and claims the priority under 35 U.S.C. §119 of German Patent Application 100 00 915.8, filed on Jan. 12, 2000, the entire disclosure of which is incorporated. herein by reference.

FIELD OF THE INVENTION

The invention relates to a brake for a vehicle and particularly an aircraft, but also a land vehicle, including at least one stator brake disk that is fixed to a rotatable wheel axle, and at least one rotor brake disk that is rotatable relative to the wheel axle and arranged parallel to the stator brake disk. The stator brake disk includes a brake lining or brake pad arranged circumferentially around a supporting ring that is mechanically secured to the wheel axle.

BACKGROUND INFORMATION

In the field of aircraft construction, it is conventionally known to use hydraulically actuated multi-disk brakes for the landing gear wheels, especially of larger aircraft such as commercial transport aircraft. Such multi-disk brakes include stator disks and rotor disks that are arranged or stacked alternately and parallel to each other to form a brake disk packet. The disks of conventional aircraft brakes are generally made essentially of stainless steel (SST) or carbon fiber-reinforced synthetic composites (CFC). Due to the reduced weight and higher braking power capacity, the brake disks of almost all known military and civil aircraft types of modern construction consist of carbon fiber reinforced composites (CFC). Such CFC aircraft brakes, however, suffer the disadvantage of a high replacement cost, while SST brakes have a relatively short operating life (in comparison to CFC brakes), due to the high loads and resultant wear occurring during the braking of large aircraft.

A typical aircraft brake using CFC material for both the stator and rotor disks is characterized by a lower total weight and a higher braking load capacity in comparison to aircraft brakes of SST material. The CFC brake also avoids the use of an actual brake pad or brake lining per se, because the braking effect is achieved by means of a so-called disk/disk pair.

On the other hand, a typical aircraft brake using SST material is constructed as a multi-disk brake packet including stator disks and rotor disks arranged alternately in sequence one after another on the wheel axis, and received between an end disk (or backing disk) and a pressure disk (or pressure plate). The end disk is located on the side of a counter support bearing, which presses or braces against a support member that is rigidly mounted on the wheel axis and, for example, rigidly screwed to the landing gear strut or the like of the aircraft landing gear. The pressure disk, on the other hand, is located on the side of a braking piston housing which is screwed to the support on the wheel axis. A braking piston received in the braking piston housing selectively exerts a braking force onto the pressure disk in a direction toward the counter bearing, so as to press the alternately stacked discs into frictional contact with each other.

The brake linings or pads, which are subjected to extreme loads and resultant high wear due to the braking process, are rather difficult to replace, i.e. exchange, after they have been worn beyond an acceptable limit. Namely, a complete disassembling of the brake arrangement is practically always required when it is necessary to exchange the brake linings or pads. Since the brake pads are secured to the brake disk or rotor support ring by rivets, these rivet connections must be bored out or otherwise broken or released in order to exchange the used brake pads with new brake pads. Then the new brake pads are once again riveted onto the associated support ring. Then, the rest of the previously disassembled brake arrangement must be reassembled. As can be appreciated, this is a very time consuming and costly process. Also, the support ring can suffer wear or damage as a result of repeated removal of old rivets and re-setting of new rivets. The overall maintenance cost and effort is quite considerable for aircraft using such brakes, because such civil aircraft operated by commercial airlines have rather strictly limited time frames prescribed for the maintenance and replacement of the brakes and particularly the brake pads.

The German Patent Publication DE 197 11 829 C1 discloses a method of manufacturing a fiber-reinforced composite ceramic material with high-temperature high-strength fibers on the basis of silicon, carbon, boron, nitrogen or compounds thereof, which are reaction bonded with a matrix of silicon or silicon alloys or compounds. Such fiber-reinforced composite ceramic materials are also usable for manufacturing brake disks in a simple and economical manner. Other ceramic materials are also generally known in the art. For example, a fiber-reinforced ceramic with an oxide system, for example Nextel™, fibers of the 3M Company, based on alumina with an oxide matrix, such as mullite for example, or in combination with a carbide matrix, such as silicon carbide for example, are generally known in the art.

Without further going into the details, there is no known reference in the relevant trade literature, that makes a suggestion to use brake pads made of the above mentioned materials in the above mentioned manner for vehicle brakes and particularly aircraft brakes. The trade literature further gives no hints or suggestions toward the particular localized use of at least one of such brake disks as a stator or a rotor within a multi-disk brake packet of an aircraft brake.

In the field of aircraft construction, there has been a constant effort to achieve landing gear wheel brakes having a relatively low weight, a relatively high braking power capacity, an economical fabrication, and relatively low expected maintenance and replacement part costs, in comparison to prior conventional aircraft brakes. Mostly due to these constant efforts to achieve these advantages in combination, there has never been achieved or suggested a multi-disk brake with alternating disks of different materials, and particularly using a fiber reinforced ceramic for one of the two brake disks that will come into contact with each other, in view of the braking properties and the unavoidable wear of the effective brake surfaces of such a vehicle brake.

SUMMARY OF THE INVENTION

In view of the above, it is an object of the invention to provide a vehicle brake arrangement having a low total weight and a high braking power capacity, and which utilizes brake disks that achieve a simple and economical maintenance with a simple and quick exchange of the brake linings or pads, in comparison to prior art brake arrangements. The invention further aims to avoid or overcome the disadvantages of the prior art, and to achieve additional advantages, as apparent from the present specification.

The above objects have been achieved according to the invention in a vehicle brake arrangement including a rotatable wheel axle, and a brake disk stack or packet that includes at least one stat or brake disk secured on the wheel axle, and at least one rotor brake disk that is rotatably supported relative to the wheel axle and is arranged parallel to the stator brake disk. The stator brake disk includes a support arrangement that is mechanically connected to the wheel axle and a brake pad arrangement secured to the support arrangement. The support arrangement includes a support ring and a plurality of support members or support arms that protrude substantially radially from the outer circumference of the support ring and are circumferentially spaced apart from one another. The brake pad or lining arrangement includes a plurality of plate-shaped brake segments that are respectively removably and exchangeably arranged between respective neighboring ones of the support arms.

Throughout this specification, the term "plate-shaped" is intended to designate a shape of a member that extends along a plan and that is significantly larger in two dimensions along that plane than in a thickness dimension perpendicular to that plane. Throughout this specification, the terms "radial", "circumferential", "axial" and the like are to be understood with respect to the rotation axis of the rotating set of brake discs, unless otherwise stated or apparent from a particular context.

The above objects have further been achieved according to the invention in a vehicle brake arrangement including at least one stator brake disk and at least one rotor brake disk as generally described above, whereby the stator brake disk includes a support arrangement and a brake pad arrangement secured thereon. The brake pad arrangement includes a plurality of brake segment pads made of a sintered metal material and adhered onto a plate-shaped brake segment carrier, whereby the brake segment carrier and brake segment pad together form a respective brake segment which is removably and exchangeably arranged on the support arrangement. The rotor brake disk is made of a ceramic material. By selectively bringing the rotor brake disk into contact with the brake segment pad of the stator brake disk, the resulting friction provides the desired braking effect.

BRIEF DESCRIPTION OF THE DRAWINGS

In order that the invention may be clearly understood, it will now be described in connection with example embodiments, with reference to the accompanying drawings, wherein:

FIG. 2 shows a schematic top view of a portion of an inventive brake arrangement, as seen in a radial direction; and FIG. 3 shows a schematic top view of another portion of an inventive brake arrangement, as seen in a radial direction.

Figure 1:
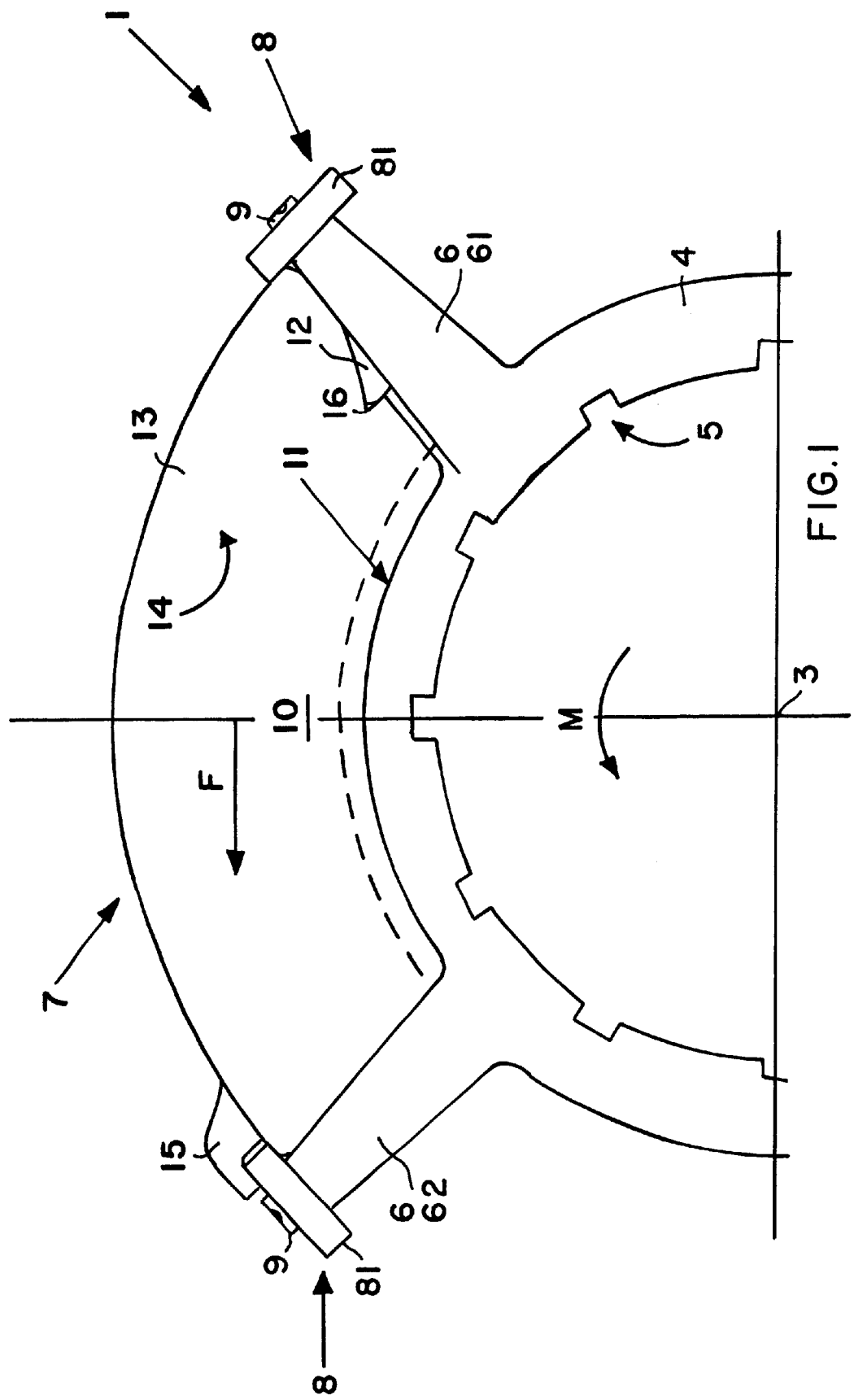
FIG. 1 shows a schematic axial side view of a portion of a brake arrangement according to the present invention.

DETAILED DESCRIPTION OF PREFERRED EXAMPLE EMBODIMENTS AND OF THE BEST MODE OF THE INVENTION

While the inventive brake arrangement is applicable to any moving vehicle brake system, including the brakes of a land vehicle (e.g. a rail vehicle or a roadway motor vehicle), the invention is primarily directed to an aircraft landing gear brake. Accordingly, the example embodiment that will be described below relates to an aircraft brake.

A typical conventional aircraft brake is generally constructed as his been described above. More particularly, the above mentioned brake disk packet or stack is bounded between a pressure disk or pressure plate on the side of the brake piston housing, and a counter disk or counter plate on the side of the counter bearing. A brake piston is arranged in the form of a ring in the brake piston housing, and is selectively actuated to exert a braking force onto the pressure disk so as to move the pressure disk toward the counter bearing, thereby clamping the brake disks between the pressure disk and the counter disk. The braking effect is thereby achieved in that an increased frictional force and thus an increased resistance against relative rotation is achieved between the rotor brake disks and the stator brake disks due to the axially directed clamping force applied thereto. Thus, the rotor disks exhibit a higher resistance against being along with the rotating wheel, due to the friction of the rotor disks relative to the stator disks, or even the rotor disks are completely locked or fixed against rotation relative to the stat or disks. Once the braking force is no longer applied by the brake piston, a return spring arrangement retracts the pressure disk back into its initial inactive position, which releases the respective brake disks to allow free rotation therebetween.

The inventive brake arrangement is generally based on or begins from the above described conventional brake arrangement as a starting point, with further special features according to the invention, as shown in FIGS. 1 to 3. The complete structure of the inventive brake arrangement is generally called or designated as a CMC (ceramic-matrix-composite) brake. The details thereof will now be described in connection with the drawings.

The brake arrangement according to the invention includes a brake disk packet arranged between a pressure disk 20 and a counter disk, as generally described above. Furthermore, the inventive brake arrangement includes guide elements arranged with respect to the pressure disk 20 and the counter disk mentioned above, as well as a brake piston housing with a brake piston that acts on the pressure disk, and a counter bearing that supports or braces the counter disk, as generally discussed above. The arrangement of the pressure disk, the counter disk, the brake piston and its housing, the counter bearing, and the guide elements to allow a relative lateral or axial guided motion of the components when the brake piston exerts a braking force onto the pressure disk, can be according to any conventionally known arrangement, and will not be described or illustrated in detail herein.

The brake disk packet includes a plurality of alternately arranged or stacked stator brake disks 1 and rotor brake disks 2. Each individual stator brake disk 1 is secured onto a wheel axle 3, which rotates as shown by the arrow M together with the respective associated aircraft landing gear wheel that is carried by this wheel axle 3. On the other hand, each individual rotor brake disk 2 is movably or rotatably supported relative to the wheel axle 3, so that the rotor brake disk 2 can rotate relative to the wheel axle 3, or vice versa. In general, it can be said that one set of the brake disks rotates together with the rotating wheel that is to be braked, and the other set of brake disks remains relatively stationary with respect to the vehicle, for example by being fixed to a non-rotating frame member of the vehicle. The terms "rotor" and "stator" are of course dependent on the frame of reference for the motion. The respective stator brake disks 1 and rotor brake disks 2 of the brake disk packet are all arranged parallel to one another, i.e. the major brake disk surfaces of the brake disks extending radially relative to the axis of the wheel axle 3 are all parallel to one another. As a result of the relative rotation M, a frictional force F is generated respectively between the rotor brake disks and the brake pads of the stator brake disks when the braking force is applied thereto in the axial direction.

FIG. 1 shows a side view or end view of half of a stator brake disk 1, which comprises a support arrangement including a support ring 4 and a plurality of support members or support arms 6 protruding radially outwardly from an outer circumferential surface of the support ring 4. An inner circumferential surface of the support ring 4 is provided with key-way grooves 5 which engage with the keys or splines of a splined shaft, by which the support ring 4 is mechanically fixed to the wheel axle 3, which is simply schematically indicated by the axis 3. The several support arms 6 protruding radially from the outer circumferential surface of the support ring 4 are uniformly circumferentially spaced from one another, for example by about 90° in the embodiment of FIG. 1 having four of the support arms 6. The support arms 6 are rigidly connected to the support ring 4, for example being integrally formed with the support ring 4 or being rigidly secured thereto by welding, riveting, bolting, etc.

With this arrangement, respective annular disk-shaped support areas or spaces 10 are formed between successive ones of the support arms 6. For example, in the embodiment of FIG. 1, four such spaces 10, each spanning substantially almost 90°, are provided respectively between successive ones of the four support arms 6. A respective plurality of brake segments 7 are respectively arranged in these annular arc-segment shaped spaces 10 between the successive support arms 6. The brake segments 7 respectively extend along a radial plane perpendicular to the wheel axis 3, and are secured to and between the support arms 6 as will be described in detail below. The particular structure of each brake segment 7 will also be described in more detail below.

Each individual support arm 6 preferably has a non-rectangular cross-section, and for example has a trapezoid-shaped cross-section. As a further example, each individual support arm 6 does not have a cylindrical shape, but rather an angular three-dimensional body shape, for example in the form of a frustum of a cone. The base of such a support arm body is rigidly secured onto the outer circumference of the support ring 4, preferably to be substantially flush with the ring width of the support ring 4.

The outwardly protruding free end of each one of the support arms 6 is equipped with a rotatable or pivotable locking member 8, which is rotatable or pivotable relative to the support arm 6, and particularly about the longitudinal axis of the support arm 6, which extends radially relative to the wheel axis 3. In its simplest form, the pivotable locking member 8 comprises a latch disk or bar 81 with a pivot hole therein, through which a bolt or screw 9 is fastened into the end of the support arm 6 so as to pivotably hold the locking member 8 to the support arm 6. For example, a threaded hole may simply be provided in the free end of the support arm 6. In this regard, also see FIGS. 2 and 3 in connection with FIG. 1.

As a further device for securing a respective brake segment 7 between successive ones of the support arms 6, at least alternate one of the support arms 6, e.g. a first support arm 61, are respectively equipped with a spring-biased catch 12 that is movably, e.g. pivotably, arranged in a slot-shaped recess in a lateral side of the first support arm 61, facing circumferentially toward the next or second support arm 62 (see FIG. 1). A spring (not shown) is arranged to urge or bias the catch 12 laterally outwardly from the side of the first support arm 61 toward the second support arm 62. Each one of the support arms 6 may be provided with such a catch 12, for example on only one side of the respective support arm facing toward the next support arm.

As can be seen in FIG. 1, a respective brake segment 7 is received in a respective one of the receiving areas or support spaces 10 having an annular segment shape, between the adjacent first support arm 61 and second support arm 62. Thereby, the spring-biased catch 12 on the first support arm 61 presses the brake segment 7 circumferentially tightly against the second support arm 62, while the latch bar 81 of each pivotable locking member 8 is toggled or pivoted into a circumferential extending position so as to securely hold the brake segment 7 in the respective support space 10, and against a corresponding segment 11 of the circumferential surface of the support ring 4 bounding the support space 10. In its entirety, the annular arc segment shaped support space 10 is bounded between the circumferential surface segment 11 of the support ring 4, the two mutually facing sides of the support arms 61 and 62, and an imaginary circular arc extending between the radially inwardly facing surfaces of the two latch bars 81 of the two locking members 8 of the support arms 61 and 62. The brake segment 7 preferably entirely fills this annular segment-shaped space 10.

In FIGS. 2 and 3, the respective possible positions of the latch bar 81 of the pivotable locking member 8 are evident. In FIG. 2, a latch bar 81 of a locking member 8 of a respective support arm 61 is shown in solid lines in a position in which the longitudinal extension of the latch bar 81 is aligned parallel to the wheel axis 3. This position is the unlatched position, in which the respective brake segments 7 can be removed from the respective support spaces 10. This same latch bar 81 is shown with dotted lines in a locked or latched position, in which the longitudinal extension of the latch bar 81 is aligned circumferentially on a plane perpendicular to the wheel axis 3. This is the locked or latched position, in which the latch bar 81 securely holds the respective brake segments 7 in the respective support spaces 10 on the two opposite sides of the respective support arm 61. Such a locking or latching position of the latch bar 81 of another support arm 61 is shown in FIG. 3 as well, where this latch bar 81 secures a "one-sided" brake segment in connection with a pressure plate 20 as will be described below.

FIG. 1 further shows additional preferred features of a brake segment 7 for ensuring that the brake segment 7 is fixedly secure in the respective corresponding support space 10 between two successive ones of the support arms 6. On one end of the brake segment 7, namely the end thereof facing and contacting the side of the first support arm 61 provided with the spring-biased catch 12, the brake segment 7 has a recess 16 into which the spring-biased catch 12 engages. Thereby, the brake segment 7 effectively snaps and engages into its secured position by the engagement of the catch 12 into the recess 16. On the other end of the brake segment 7, a fixing element, here particularly embodied as a protruding nose or hook 15, protrudes radially outwardly and hooks in the circumferential direction from the circumferentially outer corner of the brake segment 7. This fixing element or hook 15 preferably integrally protrudes from the structure of the brake segment 7, as will be discussed below. The hook 15 hooks around the above-described latch bar 81 when the latch bar is in the locking position.

With the above described measures, the brake segment 7 is positively and fixedly secured to the support ring 4, yet remains easily replaceable or exchangeable, by simply pivoting the latching bars 81 by 90°, depressing the spring-biased catch 12 against the biasing force of the spring, and then tilting and lifting the used brake segment 7 substantially radially out of the support space 10. A new brake segment 7 is installed and secured in this support space 10 by carrying out the opposite procedure.

FIG. 2 shows a top view of a portion of the inventive brake disk arrangement, and particularly only a portion of a brake disk stack, including a single stator brake disk 1 and a single rotor brake disk 2 arranged parallel to each other along the wheel axis 3. It should be understood that the complete brake arrangement includes a plurality of alternating stator brake disks and rotor brake disks arranged between a pressure plate and a counter plate as described above.

In any event, the detail view of FIG. 2 shows the structure of each respective brake segment 7, which comprises a plate-shaped brake segment carrier or substrate 13 and a brake segment lining or pad 14 respectively secured on (one side or) both opposite sides of the brake segment carrier 13. The brake segment pads 14 are preferably adhesively bonded onto the brake segment carrier 13 using an appropriate adhesive for the respective materials being bonded and with a sufficient temperature resistance in view of the expected operating temperatures of the brake arrangement. As shown by the dashed lines indicating the locked or latched position of the latch bar 81 in FIG. 2, it is clear that the latch bar 81 only bears against the brake segment carrier 13, and does not apply any locking force onto the brake segment pads 14. This is also true of the above described protruding hook 15 (i.e. the hook integrally protrudes from the carrier 13 but not the 1ads 14) and the recess 16 cooperating with the spring-loaded catch 12 (i.e. the recess 16 is provided in the edge of the carrier 13 but not in the pads 14). Namely, all of the securing and bearing force is applied to the structurally strong brake segment carrier 13, while the brake segment pads 14 are adhesively carried by the carrier 13.

It is further apparent that the latch bar 81 does not interfere with the adjacent rotor brake disk 2. Also, the above described support arms 6 do not protrude beyond the effective brake surface of the brake segment pads 14 in the axial direction of the wheel axis 3. Thus, only the effective brake pad surfaces of the brake segment pads 14 will come into contact with the facing surface of the rotor brake disk 2 when a braking force is clampingly applied to the brake disk stack or packet.

FIG. 3 shows another portion of the brake disk packet, namely a portion at an end of the brake disk packet, including a pressure disk 20 and an adjacent rotor brake disk 2. In this area, a respective brake segment carrier 13 is provided with a brake segment lining or pad 14 on only one side thereof, namely the side facing the adjacent rotor brake disk 2. The opposite side of the brake segment carrier 13 is adjacent to the pressure disk 20. As further shown in FIG. 3, the pivotable locking member 8 secured to the support arm 61, in this case, secures the stator brake disk 1 to the pressure disk 20. Namely, the latch bar 81, once it is turned into the illustrated latching position and the screw or bolt 9 is turned tight, bears on and secures the brake segment carrier 13 while also overlapping onto the outer circumference of the pressure disk 20. Thus, the stator brake disk 1 is secured to the pressure disk 20, while the respective rotor brake disks 2 of the stack or packet are each movably or rotatably supported relative to the rotating wheel axle indicated by the wheel axis 3.

The following description will address the various materials that can be used to manufacture the brake segment 7 to achieve selected particular braking characteristics of the so-called CMC brake, while allowing the efficient replacement or exchange of the brake pads. In this context, the brake segment pads 14 of the brake segments 7 as described above are fabricated of a sintered metal material which is securely joined onto the plate-segment-shaped brake segment carrier 13, or example by an adhesive that is suitable for the materials and temperatures at hand. Alternatively, the brake segment pads 14 can be sintered, brazed, or welded onto the brake segment carrier 13. These two elements are securely joined to each other to form the removable brake segment 7, which can be exchanged and replaced as a unit relative to the support ring 4. This replacement or exchange of the brake segments 7 can be carried out not only to replace used brake segments 7 with new brake segments 7, but also to achieve different braking characteristics simply by installing different brake segments 7, for example made of different materials.

The support ring 4, the support arms 6, 61, 62, and the brake segment carrier 13, can respectively be made of any suitable materials, such as light metal alloys known in the art. The rotor brake disks 2 are fabricated of a ceramic material. Thus, the alternating braking contact between the sintered metal brake segment pads 14 and the ceramic rotor brake disks 2 provides the desired friction to achieve the required braking effect.

More particularly, the ceramic material of the rotor brake disks 2 is a fiber-reinforced ceramic material, of which the reinforcement fibers are preferably homogeneously distributed in order to achieve uniform and homogeneous thermophysical material characteristics. Such a fiber-reinforced ceramic is especially advantageous in that it withstands, transmits, and thereby reduces the internal stresses that arise during the braking process within the rotor brake disks 2. Such a fiber-reinforced ceramic material also provides a good thermal conductivity through the cross-section of the rotor brake disk 2, which allows the frictional heat during the braking process to be dissipated effectively.

According to particular advantageous embodiments, the rotor brake disks may be made of a C/Sic, C/SiSiC, SiC/SiC, SiC/SiSiC or other ceramic comprising an oxide ceramic system. Such an oxide system ceramic may comprise Nextel™ fibers on the basis of aluminum dioxide with an oxide matrix, for example mullite, or in combination with a carbide matrix such as SiC. The ceramic material of the rotor brake disk 2 preferably comprises a combination of approximately 15 to 40 vol. % of short carbon fibers, approximately 40 to 70 vol. % of silicon carbide, and a maximum of 15 vol. % of silicon. in this context, the term "approximately" designates a range of ±1 vol. %, for example. Also, the term "short fibers" has its ordinary art-recognized meaning, based on the aspect ratio or length of the fibers.

In each of these embodiments, it is important that the ceramic raw material substances are mixed as homogeneously as possible to form the rotor brake disks 2. A homogeneous distribution of carbon fibers can be achieved by carrying out a pressing process to form the brake disk, with a preferred orientation of the carbon fibers in the plane of the brake disk. In such a process, only relatively few large pores, which would form initiation sites for the cumulation of free silicon, will arise. On the other hand, fine pores will be homogeneously distributed, whereby these fine pores become significant for silicon melt infiltration during the fabrication of the brake disk. In this context, the molten liquid silicon reacts with the matrix carbon while thereby forming a rather large proportion of silicon carbide, which is advantageous for achieving a high thermal conductivity in the direction perpendicular to the major planes of the brake disk.

It should be further understood that any conventionally known brake pad or brake lining materials, for example materials conventionally used in the brake pads of rail vehicles and motor vehicles, may alternatively be used for the brake segment pads 14 of the stator brake disks 1 according to the invention. For example, a person of ordinary skill in the art will readily be able to select a suitable material among available organic-based pad materials or metal/carbon composite pad materials.

Another optional but advantageous detail is to provide hollow spaces or venting passages within the stator brake disks 1 or the rotor disks, in order to provide an air-cooling effect to improve the dissipation of the frictionally generated heat during braking. Such hollow chambers or air vent passages can be provided in any configuration or any manner known in the prior art relevant to brake arrangements.

The inventive arrangement allows a very simple, quick and economical replacement or exchange of the brake segments 7. Using appropriate tools, the pivotable locking members 8 are simply opened by turning the latching bars 81 by 90° so that they do not bear on and secure the brake segment carriers 13. Then, the respective released brake segment 7 is simply pulled essentially radially away from the wheel axis 3, whereby it may be additionally necessary or advantageous to depress the spring-biased catch 12 in order to release the catch 12 from the corresponding recess 16 in the brake segment carrier 13. Then, a new brake segment 7 is simply placed into the now-vacant support space 10, whereby the spring-biased catch 12 engages into the corresponding recess 16 of the new brake segment 7. Thereafter, the latching bars 81 are simply turned by 90° to be aligned in a circumferential direction and thereby securely lock the brake segments 7 into place. Due to the simple access and removal and replacement of the brake segments 7 in this manner, it is very simple to carry out the brake segment exchange without needing to disassemble the other remaining components of the brake arrangement.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A vehicle brake arrangement comprising:
   a first brake disk arranged concentrically on an axis; and
   a second brake disk that is arranged concentrically on said axis, parallel to said first brake disk, and that is rotatable relative to said first brake disk about said axis;
   wherein said first brake disk comprises a support arrangement including a support ring, a plurality of support arms that are fixed to said support ring and respectively protrude outwardly from an outer circumferential surface of said support ring and that are circumferentially distributed and spaced apart relative to each other with respective circumferential segment-shaped spaces therebetween, and a plurality of pivotable locking members that are respectively pivotably connected to respective outwardly protruding free ends of said support arms;
   wherein said first brake disk. further comprises a plurality of plate-shaped brake segments that are respectively arranged and removably secured in said segment-shaped spaces between said support arms; and
   wherein each one of said brake segments comprises at least one brake segment pad arranged and adapted to selectively frictionally contact said second brake disk.

2. The vehicle brake arrangement according to claim 1, further comprising a rotatable wheel axle extending coaxially along said axis, wherein said support ring of said first brake disk is fixedly secured to said rotatable wheel axle, and wherein said axle is rotatably supported relative to said second brake disk.

3. The vehicle brake arrangement according to claim 1, wherein each one of said support arms has a non-rectangular, trapezoidal cross-sectional shape.

4. The vehicle brake arrangement according to claim 1, wherein each one of said support arms has a non-cylindrical, conical frustum three-dimensional shape.

5. The vehicle brake arrangement according to claim 1, wherein each one of said support arms has a prismatic three-dimensional shape, with a base surface that surfacially contacts and is secured to said outer circumferential surface of said support ring.

6. The vehicle brake arrangement according to claim 1, wherein each one of said pivotable locking members respectively comprises an elongated latch bar that is pivotably secured on said respective outwardly protruding free end of a respective one of said support arms, and wherein said latch bar can be pivoted into a circumferentially aligned latching position in which respective distal ends of said latch bar bear against and lockingly secure said brake segments.

7. The vehicle brake arrangement according to claim 1, wherein each one of said segment-shaped spaces is bounded by an arc segment portion of said outer circumferential surface of said support ring, by two adjacent ones of said support arms, and by a fictitious circular arc segment line extending circumferentially between respective inwardly facing surfaces of said pivotable locking members respectively connected to said free ends of said two adjacent ones of said support arms, and wherein each one of said brake segments respectively has a shape corresponding to and respectively fills a respective one of said segment-shaped spaces.

8. The vehicle brake arrangement according to claim 1, wherein at least one of said support arms has a slot in a circumferentially facing surface thereof, and further comprises a catch member movably arranged at least partially in said slot and a biasing spring that biases said catch member to protrude circumferentially out of said slot toward a next adjacent one of said support arms and into contact with a respective one of said brake segments arranged between said at least one of said support arms and said next adjacent one of said support arms.

9. The vehicle brake arrangement according to claim 1, wherein each one of said brake segments respectively further comprises a plate-shaped brake segment carrier, and wherein a respective one of said brake segment pad is bonded surfacially onto at least one major surface of said brake segment carrier.

10. The vehicle brake arrangement according to claim 9, wherein a braking surface of said brake segment pad protrudes in an axial direction parallel to said axis beyond a radially extending side surface of said support ring, and said braking surface entirely fills a respective one of said segment-shaped spaces.

11. The vehicle brake arrangement according to claim 9, wherein each one of said brake segments respectively further comprises a hook member protruding radially outwardly from a radially outer edge of said brake segment carrier, and wherein said hook member respectively hooks over and engages a respective one of said pivotable locking members.

12. The vehicle brake arrangement according to claim 9, wherein said brake segment pad consists essentially of a sintered metal, and wherein said second brake disk consists essentially of a ceramic or a ceramic-based composite.

13. The vehicle brake arrangement according to claim 1,
wherein said second brake disk comprises a ceramic-based material;
wherein each one of said brake segments respectively further comprises a plate-shaped brake segment carrier, and wherein said at least one brake segment pad essentially consists of at least one of a sintered metal, an organic based pad material, and a metal/carbon composite material, and is bonded onto at least one respective major surface of said brake segment carrier; and
wherein said first and second brake disks are relatively movably arranged so that said brake segment pads selectively frictionally contact said second brake disk.

14. The vehicle brake arrangement according to claim 13, wherein said first brake disk is a stator brake disk, and said second brake disk is a rotor brake disk that is rotatable relative to said stator brake disk.

15. The vehicle brake arrangement according to claim 13, wherein said ceramic-based material is a ceramic-based composite.

16. The vehicle brake arrangement according to claim 13, wherein said ceramic-based material comprises at least one of a C/SiC, C/SiSiC, SiC/SiC, or SiC/SiSiC ceramic-based material.

17. The vehicle brake arrangement according to claim 13, wherein said ceramic-based material comprises an oxide system ceramic-based material.

18. The vehicle brake arrangement according to claim 17, wherein said oxide system ceramic-based material comprises Nextel™ fibers based on alumina dispersed in a matrix comprising an oxide matrix material.

19. The vehicle brake arrangement according to claim 18, wherein said oxide matrix material comprises mullite.

20. The vehicle brake arrangement according to claim 18, wherein said matrix further comprises a carbide matrix material in combination with said oxide matrix material.

21. The vehicle brake arrangement according to claim 20, wherein said carbide matrix material comprises SiC.

22. The vehicle brake arrangement according to claim 13, wherein said ceramic-based material comprises approximately 15 to 40 vol. % of short carbon fibers, approximately 40 to 70 vol. % of silicon carbide, and silicon of not more than 15 vol. %.

23. A vehicle brake arrangement comprising:
a first brake disk arranged concentrically on an axis; and
a second brake disk that is arranged concentrically on said axis, parallel to said first brake disk, and that is rotatable relative to said first brake disk about said axis;
wherein said first brake disk comprises a support arrangement including a support ring and a plurality of support arms that are fixed to said support ring and respectively protrude outwardly from an outer circumferential surface of said support ring, and that are circumferentially distributed and spaced apart relative to each other with respective circumferential segment-shaped spaces therebetween;
wherein said first brake disk further comprises a plurality of plate-shaped brake segments that are respectively arranged and removably secured in said segment-shaped spaces between said support arms;
wherein each one of said brake segments comprises at least one brake segment pad arranged and adapted to selectively frictionally contact said second brake disk; and
wherein at least one of said support arms has a slot in a circumferentially facing surface thereof, and further comprises a catch member movably arranged at least partially in said slot and a biasing spring that biases said catch member to protrude circumferentially out of said slot toward a next adjacent one of said support arms and into contact with a respective one of said brake segments arranged between said at least one of said support arms and said next adjacent one of said support arms.

24. The vehicle brake arrangement according to claim 23, wherein said respective one of said brake segments has a recess in a side edge thereof, and said catch member is urged by said spring into engagement in said recess so as to securely hold said respective one of said brake segments.

* * * * *

UNITED STATES PATENT AND TRADEMARK OFFICE
CERTIFICATE OF CORRECTION

PATENT NO.     : 6,439,353 B2
DATED          : August 27, 2002
INVENTOR(S)    : Roloff et al.

It is certified that error appears in the above-identified patent and that said Letters Patent is hereby corrected as shown below:

Column 4,
Line 15, before "along", insert -- rotated --.

Column 5,
Line 59, after "alternate", replace "one" by -- ones --.

Column 6,
Line 45, after "fixedly", replace "secure" by -- secured --.

Column 7,
Line 29, before "14)", replace "1ads" by -- pads --.

Signed and Sealed this

Seventeenth Day of December, 2002

JAMES E. ROGAN
*Director of the United States Patent and Trademark Office*